Jan. 12, 1932.   C. H. ARNOLD   1,840,555

CASH REGISTER

Filed March 6, 1926   10 Sheets-Sheet 1

Inventor
Charles H. Arnold
By
His Attorneys

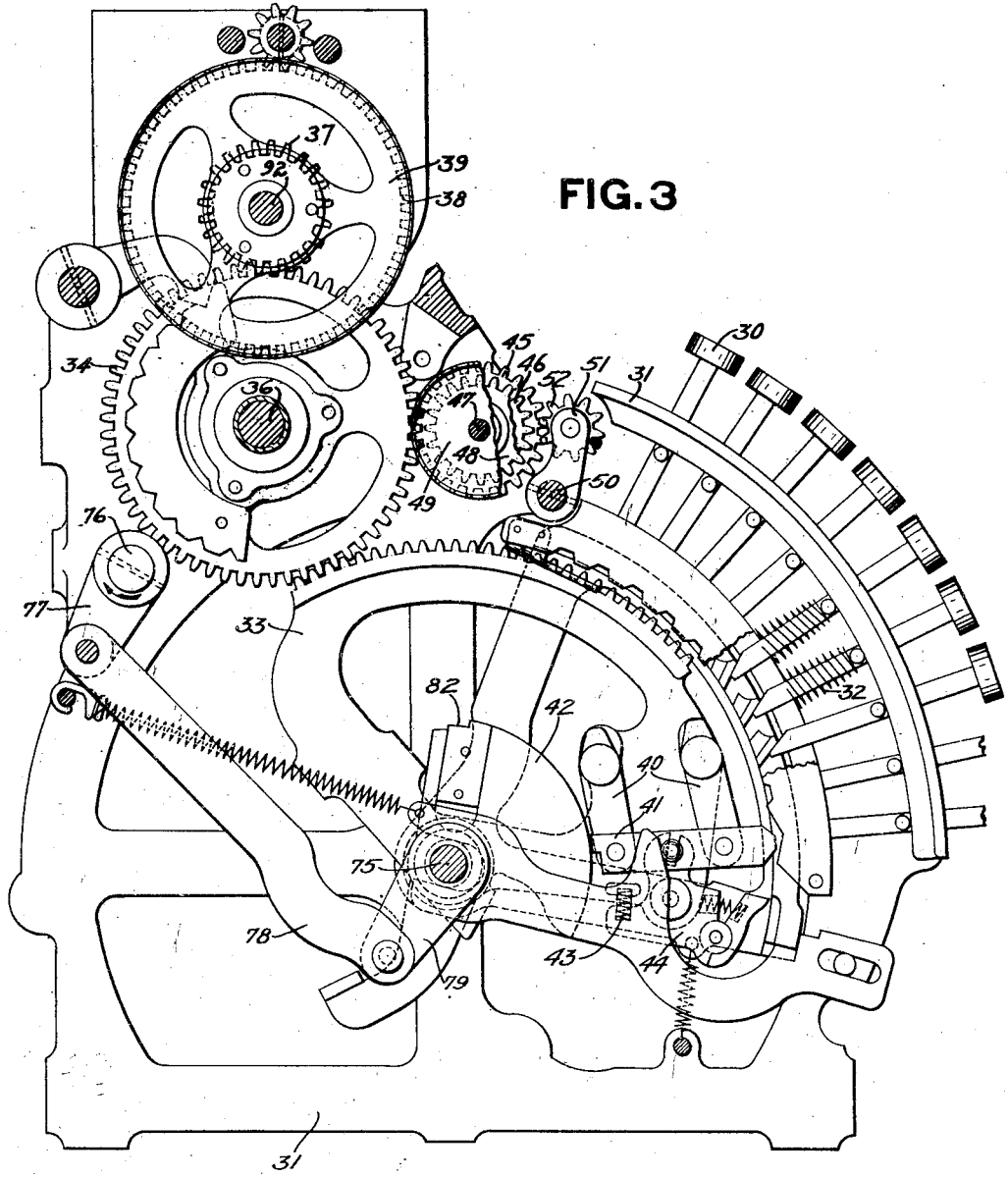

Inventor
Charles H. Arnold
By
His Attorneys

Jan. 12, 1932.  C. H. ARNOLD  1,840,555
CASH REGISTER
Filed March 6, 1926   10 Sheets-Sheet 4
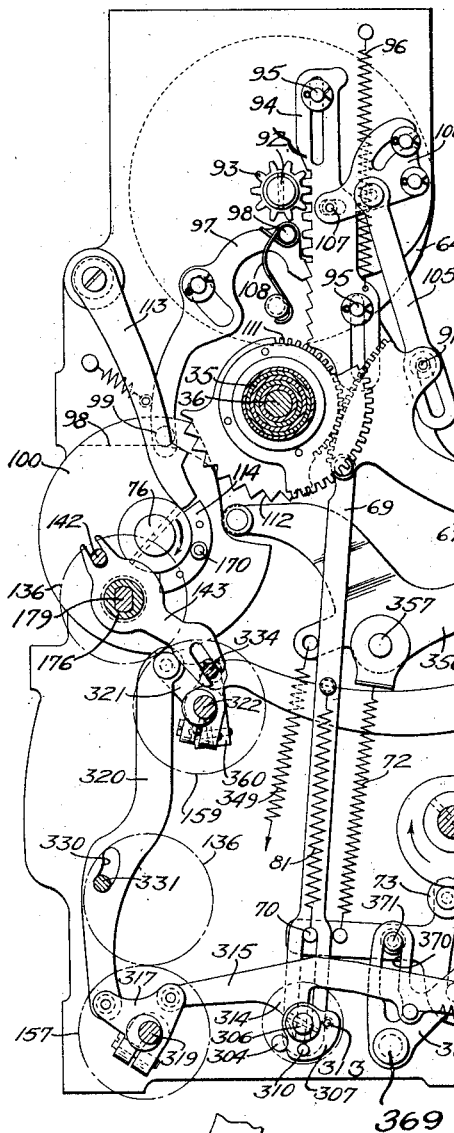
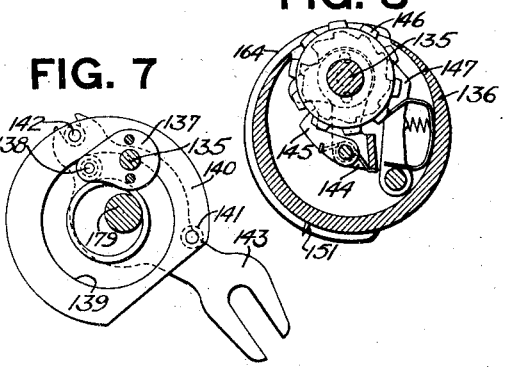
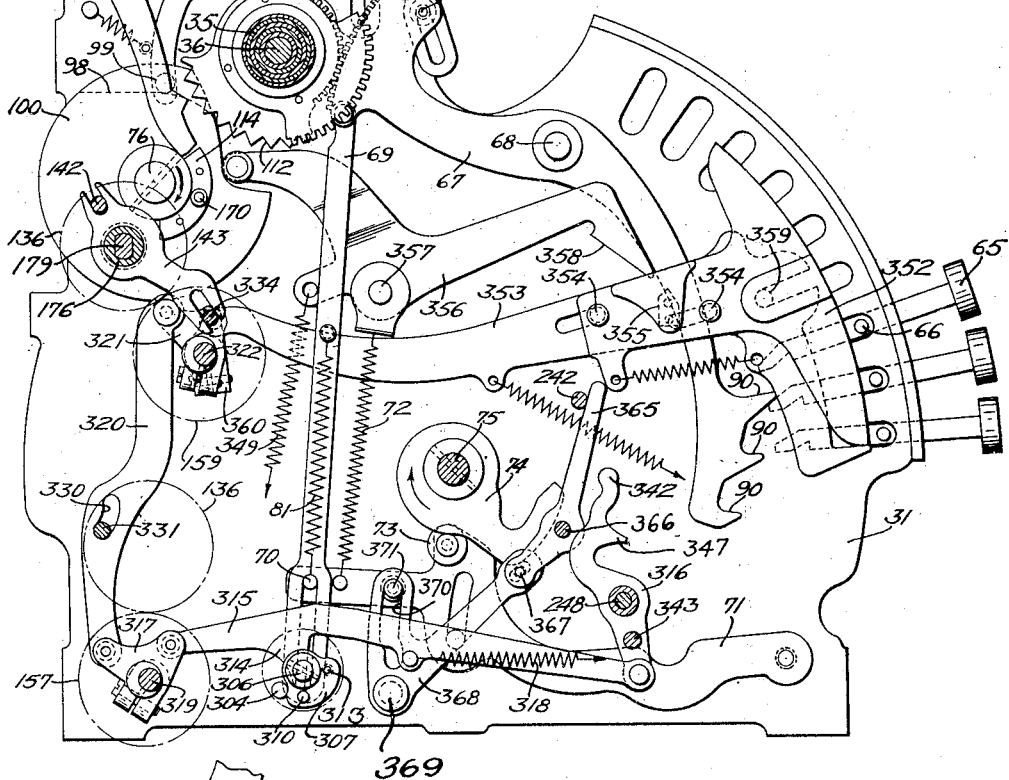
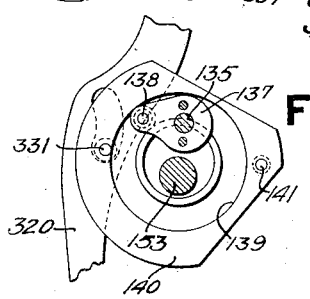
Inventor
Charles H. Arnold
By
His Attorneys Jan. 12, 1932.  C. H. ARNOLD  1,840,555
CASH REGISTER
Filed March 6, 1926   10 Sheets-Sheet 6

Inventor
Charles H. Arnold
By Carl Beust
Henry E. Stauffer
His Attorneys

Jan. 12, 1932.   C. H. ARNOLD   1,840,555
CASH REGISTER
Filed March 6, 1926    10 Sheets-Sheet 7

FIG. 12

```
55 980      ChH-6.35
Ledger Number   Amount of Transaction

DOE BROS. GARAGE

Clerk  H     Date  Feb 10    1926
Name   John Smith
Address              Am't Rec'd 1  Spark Plugs
2      Cleaned           1 35
3  Carbon Removed        5 00
4
5
6
7
8
9
10
```

FIG. 13

```
DOE BROS. GARAGE.
357986   ★K-1.35
---------------------
357986   ★K-1.35
FEB-8  015

Return $20.00 worth of
cash receipts and we
will drain your crank
case and refill with oil.
```

FIG. 14

```
           FEB-8  015
---------------------
MORE MILES TO
THE GALLON.
HIGH TEST
GASOLINE.
BEST QUALITY OF
MOTOR OILS.
```

FIG. 15

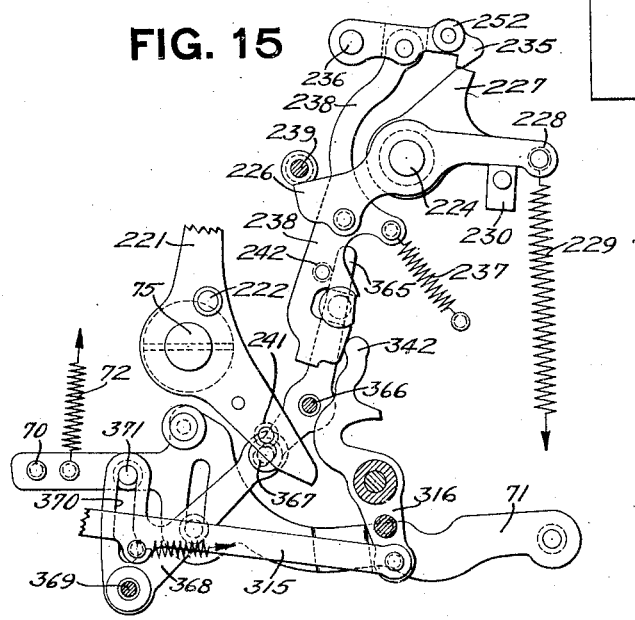

Inventor
Charles H. Arnold
By  Earl Beust
    Henry C. Stauffer
His Attorneys

Jan. 12, 1932.    C. H. ARNOLD    1,840,555
CASH REGISTER
Filed March 6, 1926    10 Sheets-Sheet 8

Inventor
Charles H. Arnold
By Pearl Beust
Henry E. Stauffer
His Attorneys

Jan. 12, 1932.   C. H. ARNOLD   1,840,555
CASH REGISTER
Filed March 6, 1926    10 Sheets-Sheet 9
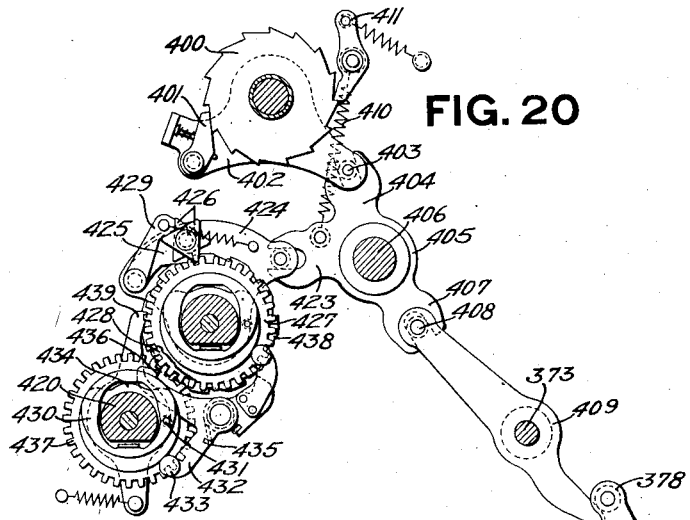
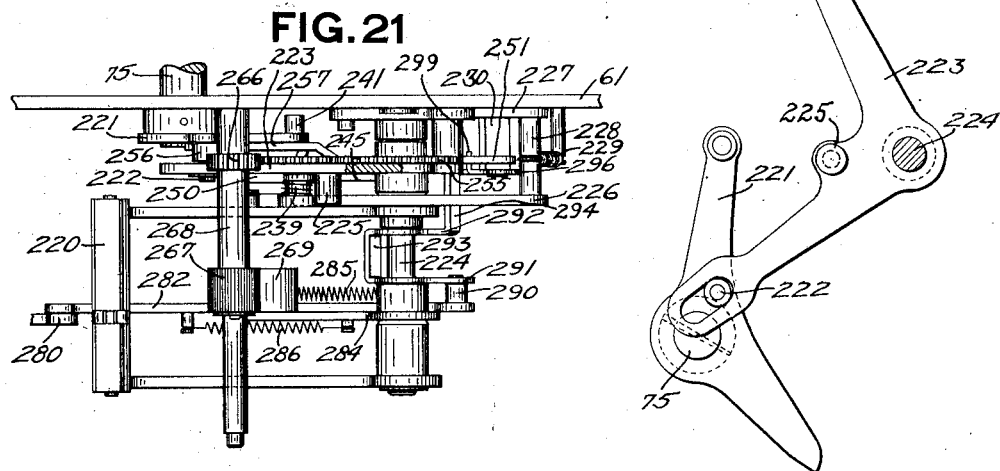
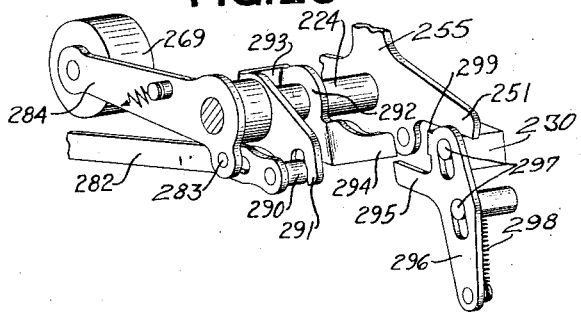
Inventor
Charles H. Arnold
By
His Attorneys Jan. 12, 1932.  C. H. ARNOLD  1,840,555

CASH REGISTER

Filed March 6, 1926  10 Sheets-Sheet 10

Inventor
Charles H. Arnold
By *Earl Beust*
*Henry C. Stauffer*
His Attorneys

Patented Jan. 12, 1932

1,840,555

UNITED STATES PATENT OFFICE

CHARLES H. ARNOLD, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed March 6, 1926. Serial No. 92,771.

This invention relates to improvements in cash registers and like machines, and more particularly to the type shown and described in Letters Patent of the United States issued to Cleal and Reinhard, April 13, 1897, No. 580,378.

One object of this invention is to provide an improved printing mechanism.

Another object is to provide a mechanism for printing two times on a stub check, a manual control for throwing said mechanism off, and a mechanism controlled by the depression of one of a number of special keys for causing a single impression to be made for printing upon an insertable slip, regardless of the position of the manual control.

Another object is to provide an improved ejector mechanism.

With these and incidental objects in view, the invention includes certain novel features of construction and combinations of parts, the essential elements of which are set forth in appended claims and a preferred form or embodiment of which is hereinafter described with reference to the drawings which accompany and form part of this specification.

In the drawings:

Fig. 1 is a perspective view of the machine with its cabinet on.

Fig. 3 is a section taken through the machine, looking towards the units amount bank.

Fig. 6 is a cross section through the machine taken at the left of the transaction bank.

Fig. 7 is a detail view of the consecutive number operating mechanism.

Fig. 8 is a section taken through the printing cylinder.

Fig. 9 is a detail view of the operating mechanism for the consecutive number device of the lower printing cylinder.

Fig. 12 is a facsimile of the sales slip showing the method of printing the record thereon.

Fig. 13 is a facsimile of the face of the check issued by the machine.

Fig. 14 is a facsimile of the back of the check issued by the machine.

Fig. 15 is a detail view of the mechanism for controlling the lower impression mechanism.

Fig. 20 is a detail view of the operating mechanism for the ribbon and the detail paper feed.

Fig. 21 is a plan view of the operating mechanism for the lower impression hammer.

Fig. 26 is a perspective view of a part of the check-ejector tension roller mechanism.

Figure 27:
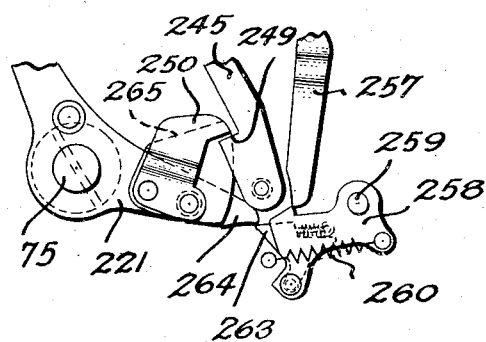

Fig. 27 is a fragmentary view showing the means for retracting the hammer for the second impression on the check, and a portion of the check ejector means which causes the feed of the check between the two impressions. In this figure the check ejector is about to be released by the lower end of the hammer retracting arm to cause the feed of the check prior to the second impression, and the hammer retracting block has not yet reached the link with which it contacts to retract the hammer.

General description

The machine, as herein disclosed, is provided with four banks of amount keys and one divided bank having six clerk's keys and three transaction keys. These banks of keys control the adjustment of the indicators and of the type carriers. A ledger number device is also provided for printing account numbers or any other identifying characters. A detail strip is provided upon which a record of each transaction is printed, which detail strip and record remains in the machine. The printer is also adapted to print on either a check or slip. The machine is normally adapted to print a stub check, however, if a transaction key is depressed, the check issuing mechanism will be automatically thrown off, because during an operation on which a transaction key is depressed, it is desired always to print on a slip.

An "on" and "off" knob is provided for manually controlling the issuing of checks. However, even when the knob is in the "off" position, and the machine is operated with a transaction key depressed, the printing mechanism will be automatically controlled to make one print on an inserted slip. A reversible ribbon is provided, which is carried on a removable frame, to permit easier changing of ribbons. The ledger number device is also carried on this removable frame.

Key banks

The machine is provided with four banks of amount keys 30 (Figs. 1 and 3) slidably mounted in frames 31 and held in their outer positions by springs 32. When the keys are depressed, they are adapted to control the differential positioning of a gear segment 33. Pivoted on the segment 33 by means of two links 40 is a latch 41, adapted to be held in engagement with a driving segment 42 by a spring 43. The spring 43 is disposed between a lug on the gear segment 33 and a latch arm 44, pivoted on the segment 33. The latch arm 44 has an upwardly extending bifurcated arm adapted to engage a stud on the latch 41, thereby tending to hold the latch against the driving segment 42. The driving segment 42 is secured to a shaft 75. The shaft 75 is oscillated once during each operation of the machine by a main operating shaft 76 (Fig. 3), through an arm 77 secured thereto and a link 78 which connects the arm 77 with an arm 79 secured to the shaft 75. The arm 79 is longer than the arm 77. Any suitable device, such as the operating handle 80 (Fig. 1) may be employed for giving the shaft 76 one complete rotation at each operation of the machine, which rotation will cause the shaft 75 to be rocked first clockwise and then counter-clockwise, as viewed in Fig. 3, due to the difference in lengths of the arms 77 and 79. The arm 77 is located on the shaft 76 in such a manner as to rock the shaft 75, first clockwise, then counter-clockwise past its home position, and then clockwise back to its home position when the shaft 76 is rotated in the direction of the arrow. The movement past the home position is for the purpose of releasing the depressed keys at the end of an operation as shown and described in the above mentioned patent.

During the first clockwise movement of the driving segment 42 the foot of the latch 41 will be moved into engagement with a shoulder 82 by the spring 43, when the shoulder 82 registers with the latch. During the counter-clockwise movement of the driving segment 42, the latch arm 44 comes into contact with the end of the depressed key and causes the latch to be disengaged from the driver 42, thereby stopping the gear segment 33 in a position commensurate with the depressed key. In this manner the gear segment 33 is positioned differentially under control of the depressed key 30.

Figure 4:
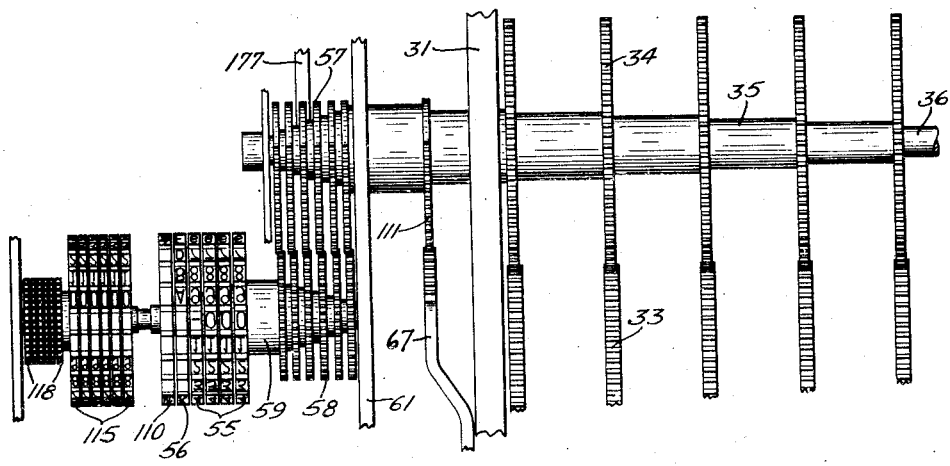
Fig. 4 is a diagrammatic view showing the method of adjusting the type wheels.
Figure 5:
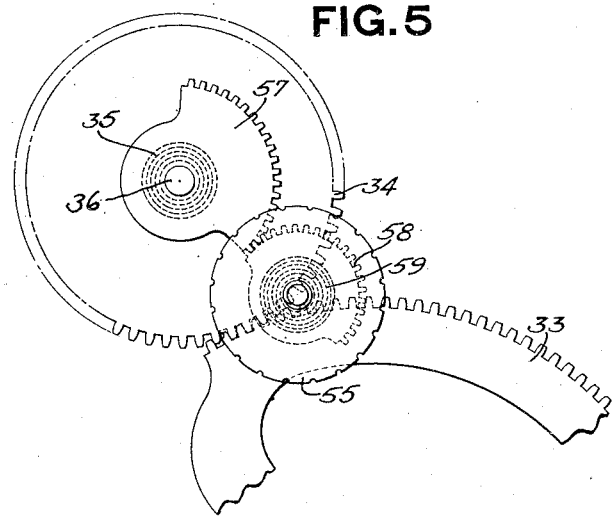
Fig. 5 is a detail view of the mechanism for adjusting the amount and transaction bank type wheels.

The segment 33 meshes with a gear 34 (see also Figs. 4 and 5). The gears 34 (one for each bank of keys) are carried on the ends of nested sleeves 35 carried on a rod 36 supported by the side frames of the machine. Each of the gears 34 meshes with a gear 37 on a shaft 92 rigidly connected by means of a sleeve (not shown), to an indicator 39 adapted to be adjusted according to the differential adjustment of the gear segment 33. The clerks' indicators are positioned in identically the same manner as the amount indicators, and therefore, no further description will be given thereof.

The segment 33 is also adapted to cause amounts to be entered into a totalizer by the gear 34 and a pinion 45 (Fig. 3) meshing therewith. Secured to the side of the pinion 45 is a pinion 46, loosely mounted on a shaft 47 carried by the frames 31. Also mounted on the shaft 47 is a gear 48 which lies beside the gear 46. Secured to the gear 48 is a totalizer wheel 49 provided with suitable characters for reading the amount on the totalizer. Mounted on a rockable shaft 50 is a plurality of arms 51 each carrying a wide pinion 52 adapted to be rocked into engagement with the gears 46 and 48, for coupling them together when the segment 33 is being differentially positioned. In this manner the amounts as determined by the differential movement of the segment 33 under control of the depressed key are accumulated into the totalizer 49. The above mechanism is old and well known in the art, and is shown in the above-mentioned Cleal and Reinhard patent, and therefore, no further description is thought necessary.

Amount type wheels

The differential gear segments 33 are also adapted to adjust type carriers 55 and 56 (Figs. 4 and 5). As above mentioned, the gears 34 which mesh with the segments 33 are secured to the ends of nested sleeves 35. Secured to the other end of each sleeve 35 is a segment 57 meshing with a segment 58 secured to one end of a sleeve 59 of a nest of sleeves carried on a stud 60 (Figs. 10 and 11), mounted on a printer frame 61. The amount type wheels 55 and the clerks' type wheels 56 are secured to the other ends of the sleeves 59. From this it is apparent that the differential adjustment of the gear segments 33 will also differentially adjust the type carriers 55 and 56.

Transaction indicator

A special indicator 64 (Figs. 1 and 6) is provided for indicating "cash," "received-on-account", "charge", and "paid-out" transactions. This indicator is under control of the transaction key 65. Each key 65 is provided with a pin 66 which projects into the plane of a lever 67 pivoted on a stud 68 carried by the left-hand frame 31 of the machine. Pivoted to the lever 67 is a link 69 slotted at its lower end to surround a stud 70 carried by an arm 71, pivoted on a stud in the frame 31. A spring 72 normally holds a roller 73 carried by the arm 71 in engagement with a cam 74 pinned to the rock shaft 75. When the cam 74 is rocked in the direction of the arrow (Fig. 6), it will cause the arm 71 to be moved downwardly and, by means of a spring 81 stretched between the stud 70 and a stud on the link 69 will cause the link 69 to be moved downwardly to rock the lever 67 in a counter-clockwise direction. This movement of the lever 67 will cause one of a plurality of projections 90 thereon to come into contact with the stud 66 of the particular key 65 depressed, whereupon the lever 67 and link 69 will be stopped, but the lever 71 will be permitted to continue to move, thereby stretching the spring 81 and lowering the stud 70 in a slot formed in the lower end of the link 69. This will cause the lever 67 to be positioned under control of the depressed key 65, thereby differentially positioning a stud 91 thereon for the purpose of controlling the adjustment of the indicator 64.

The indicator 64 is secured to the shaft 92 carried by the two left frames 31. To the shaft 92 is also secured a pinion 93 meshing with a rack 94 slidably mounted on two studs 95. A spring 96 normally tends to move the rack 94 upwardly, but is prevented from doing so by an alining lever 97 pivoted on a stud 98 carried by the left frame 31. The lower end of the lever 97 is provided with a stud 99 cooperating with a cam surface 98 on a cam 100, secured to the cam shaft 76. When the shaft 76 begins to rotate in the direction of the arrow (Fig. 6), the lever 97 will be rocked in a clockwise direction, thereby disengaging a nose thereon from a notch in the rack 94 which permits the spring 96 to carry the rack upwardly until it is stopped by the stud 91. The stud 91 carried by the lever 67 projects through a slot in a link 105 pivoted on an arm 106 having secured thereto a stud 107 which projects into a slot in the rack 94. After the rack 94 has been released as just mentioned the lever 67 will be moved by the cam arm 74 to position it under control of the depressed key 65 as above described. This movement of the lever 67 will cause the rack 94 to be moved downwardly, thereby adjusting the indicator according to the differential movement of the lever 67. Near the end of the operation and before the lever 67 is again permitted to move to its home position, the aliner arm 97 is again rocked counter-clockwise to cause the nose thereon to be engaged with one of the notches in the rack 94, thereby maintaining the indicator 64 in its adjusted position. A spring 108 normally tends to rock the arm 97 to engage it with the rack 94.

The lever 67 is provided with teeth which mesh with a segment 111 provided with notches 112. An aliner 113 is adapted to be engaged therewith by a block 114 secured to the cam 100 after the lever 67 has been adjusted thereby holding the lever 67 in its adjusted position after the cam 74 becomes disengaged from the roller 73. Near the end of the operation of the machine the aliner 113 is permitted to rock out of engagement with the segment 111 thereby permitting the spring 72 to return the arm 71 and lever 67 to their home positions.

Transaction type carrier

A special type carrier 110 (Fig. 4) has been provided for printing the kind of transaction being entered. This type carrier is secured to the left end of the innermost sleeve 59 (Figs. 4 and 5) and is adapted to be adjusted by the lever 67 (Fig. 6). As before mentioned the lever 67 is provided with teeth which mesh with the segment 111 connected with a segment 57 by one of the sleeves 35, and meshes with a segment 58 secured to the innermost sleeve 59, to which is also secured the type carrier 110. From this it can be seen that the type carrier 110 will be adjusted according to the differential adjustment of the lever 67 as controlled by the depressed key 65.

Ledger number device

A device is provided and located above the printer at the left-hand end of the machine, for recording ledger numbers, or any other data which might be desired, on the check which is issued, or upon the slip. This device consists of six type carriers 115 (Figs. 2, 4, and 11) adjusted by levers 116. The type carriers 115 are secured to the ends of nested sleeves 117 (Fig. 11) which have secured to the other ends thereof segments 118 with which segments 119 mesh. The segments 119 are secured to the ends of nested sleeves 120 to the other end of which are secured arms 121. The levers 116 are adjustably secured to arms 121 by screws 122, thereby permitting accurate adjusting of the levers 116 with the characters engaged on the index plates shown in Fig. 1. The levers 116 are held in their adjusted positions by spring-pressed pawls 123 pivoted thereto and which engage notches 124 cut in arcuate bars 125 carried by a frame 126, which is adapted to be removed from the machine. A bar 125 is provided for each lever 116, all bars being secured to the above-mentioned frame by studs 127 (see Fig. 2). The inner ends of the studs 127 support a bracket 128 which is provided for supporting a stud 129 upon which the sleeves 120 are mounted. The method of removing this frame from the machine will be described in detail when considering the ribbon mechanism.

Spring actuated aliners 130 (Fig. 11), are provided for holding the type wheels in alinement and cooperate with notches cut in the segments 118. These aliners are carried upon a stud mounted on the frame 126.

Check issuing mechanism

The method of printing the data shown on the check (Figs. 13 and 14), other than the ledger number, transaction, and amounts, is well known in the art, and therefore, only a brief description will be given herein. The date, consecutive numbering devices, and the electros are carried on printing cylinders of the type shown and described in Letters Patent of the United States issued to H. Cook, on September 27, 1892, No. 483,511, and to William Murphy, issued on June 18, 1895, No. 541,247, and reference may be had thereto for a detailed description. To such cylinders are provided, one for printing on the front and the other for printing on the back of the check. The consecutive number type wheels are mounted on a shaft 135 (Figs. 7 and 8) carried by a cylinder 136 and which projects beyond the rear end thereof. Secured to the rear end of the shaft 135 is an arm 137 provided with a roller 138 which projects into an eccentric slot 139 of a disk 140 pivotally supported on a stud 141 carried by the side frame of the machine. A stud 142 carried by the disk 140 projects into the bifurcated portion of a lever 143 (Fig. 7), for the upper cylinder and aids in the support of the disk 140. The lower disk 140 is supported by a stud 141 and by a stud 331 (Fig. 9) which projects into a slot 330 in a link 320. Once during each operation of the machine each cylinder 136 is given a complete rotation by means hereinafter described, thereby rotating the arms 137 therewith. As each arm 137 rotates, the eccentric cam slot 139 will cause the arm 137 to be oscillated once during each operation of the machine. Also secured to the shaft 135 is a frame 144 upon which is pivotally mounted a tined actuating and carrying pawl 145 adapted to add one into the consecutive counter 146 every time the shaft 135 is oscillated. Aliners 147 are provided for maintaining the consecutive number wheels in the proper alinement after they have been adjusted.

The date wheels are adjusted manually by knobs 150 (Fig. 10) in the usual and well-known manner.

A perforator blade 151 (Fig. 8), is secured to the upper printing cylinder for perforating the check paper as it is being fed by the cylinder. The location of the perforation on the issued check is shown by dotted lines in Figs. 13 and 14.

Both the upper and lower cylinders are removable from the machine for convenience in changing the electros. A removable bearing 152 (Fig. 10), is provided for each cylinder. These bearings are held in position by screws. A shaft 179 projects from the rear of the upper cylinder into a pinion 175, (Fig. 22), to be presently described, and which has a bearing in the printer frame 177. In order to remove the upper cylinder it is only necessary to remove bearing 152 after which the cylinder can be withdrawn from the pinion 175. The lower cylinder has a shaft 153 (Fig. 11) projecting into the printer frame 61 and can be withdrawn therefrom after its removable front bearing 152 is detached.

Check paper feed

Figure 10:
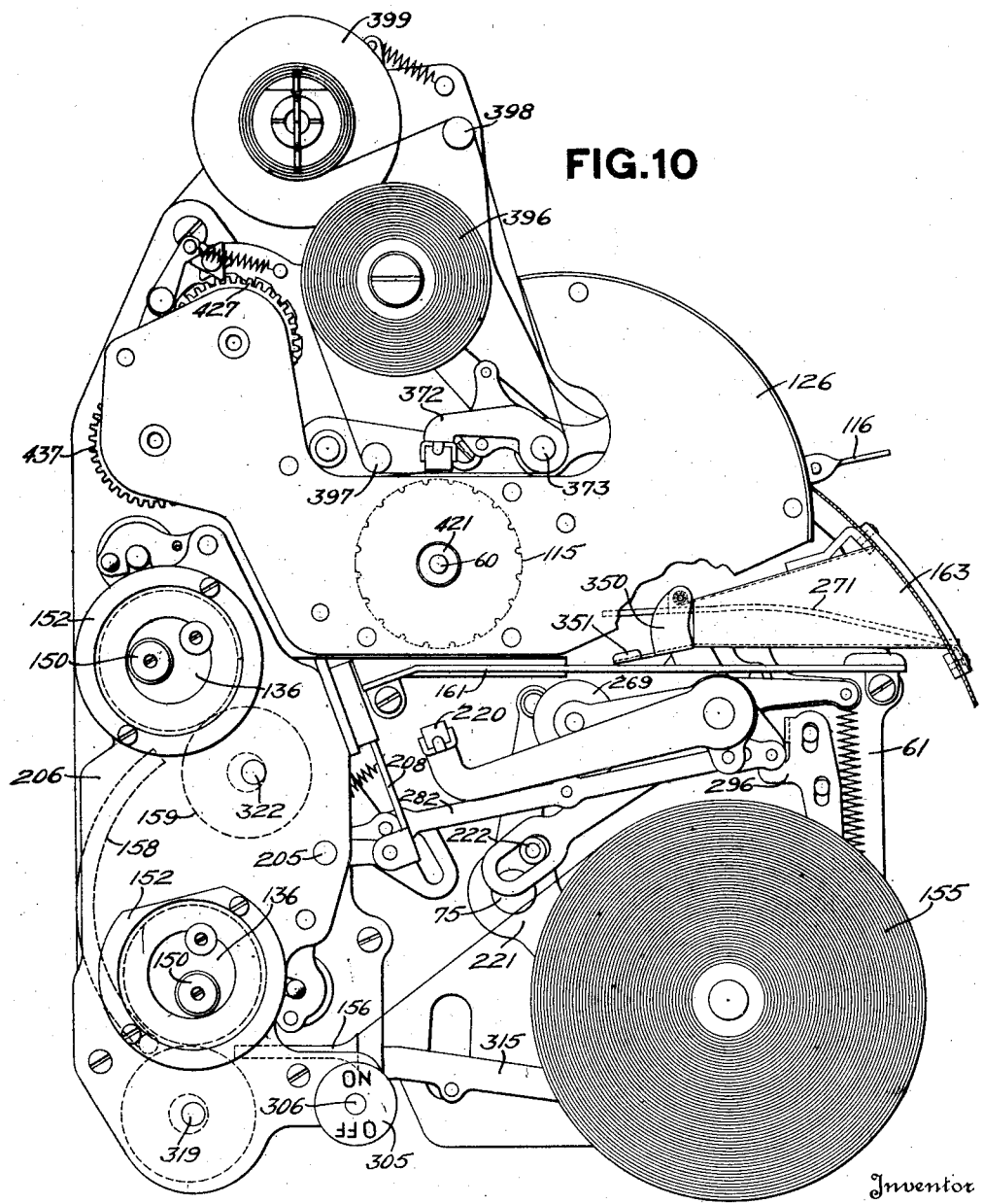
Fig. 10 is a view in elevation of the printing mechanism.

The check paper is fed from a supply roll 155 (Fig. 10), through a paper chute 156 (see also Fig. 11), between the lower printing cylinder 136 and an impression roller 157, through a paper chute 158 between the upper printing cylinder 136 and an impression roller 159, through an opening in a stationary knife blade 160, between the slip table 161 and a ribbon guard 162, from where it is ejected, after it is severed, into a retainer 163 (Fig. 10). Each printing cylinder 136 is provided with a feeding flange 164 (Fig. 8), which is of sufficient length to feed the check paper far enough to issue one check at each operation of the machine. The impression rollers 157 and 159 cooperate with these flanges 164 for feeding the paper. Ink rollers 165 (Fig. 11), are provided for each printing cylinder for inking the type and electros thereon, so that the proper impression may be made.

The means for rotating the cylinders for causing the check paper to be fed is also old and well known in the art, and therefore, only a brief description thereof will be given herein. Mounted on the cam 100 (Fig. 6) is a stud 170 which projects into an opening 171 (Fig. 22), of a pair of knife operating cams 172. The cams 172 are mounted on a stud 173 and have secured thereto a pinion 174. The pinion 174 meshes with the before mentioned pinion 175 having a hub 176 which is journalled in the printer frame 177. The cams 172 and the frame 61 hold the pinion 175 against lateral movement. The hub 176 of the pinion 175 is provided with a slot into which projects the flattened end of the shaft 179, before mentioned, projecting from the rear of the upper printing cylinder 136. Secured to the forward end of the printing cylinder is a gear 180 (Fig. 11), meshing with a gear 181, secured to the upper impression roller 159, to the other end of which is secured a gear 182. The gear 182 meshes with a pinion 183 meshing with a gear 185 secured to the rear of the lower printing cylinder 136.

From the above description it is apparent that during each operation of the machine when the shaft 76 receives its complete rotation, this movement will be transmitted to the cams 172 and pinion 174 by the pin 171, and to the pinion 175 thereby rotating the upper cylinder 136. Simultaneously the lower cylinder will be rotated by the gears 180, 181 and 182, pinion 183, and the gear 185 secured to the cylinder.

The paper chute 158 is pivoted on a stud 190 and is provided with a roller 191 held against the cam 192 on the lower printing cylinder 136 by a spring 193. The object of this construction is to permit easy insertion of the new rolls of check paper when replacing paper. The paper chute, in the position shown, interferes with the electros and type wheels on the printing cylinder, and therefore, a cam 192 is provided for rocking the chute away from the cylinder after the machine starts to operate. In this manner the paper chute is normally in a position for easily inserting the paper, and is rocked away from the printing cylinder during an operation of the machine, to permit the cylinder to rotate.

Knife mechanism

Figure 11:
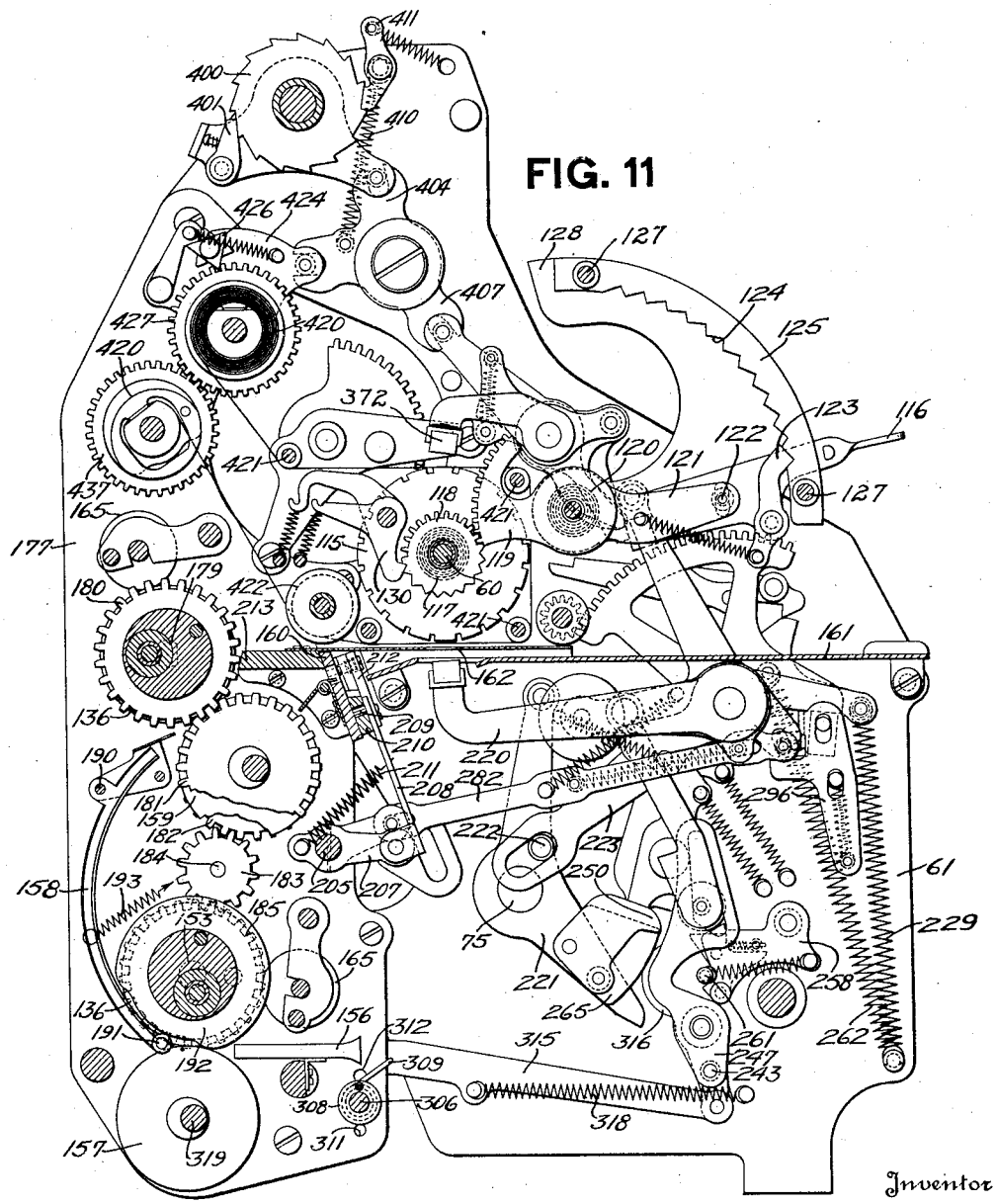
Fig. 11 is a section taken through the printing mechanism.
Figure 22:
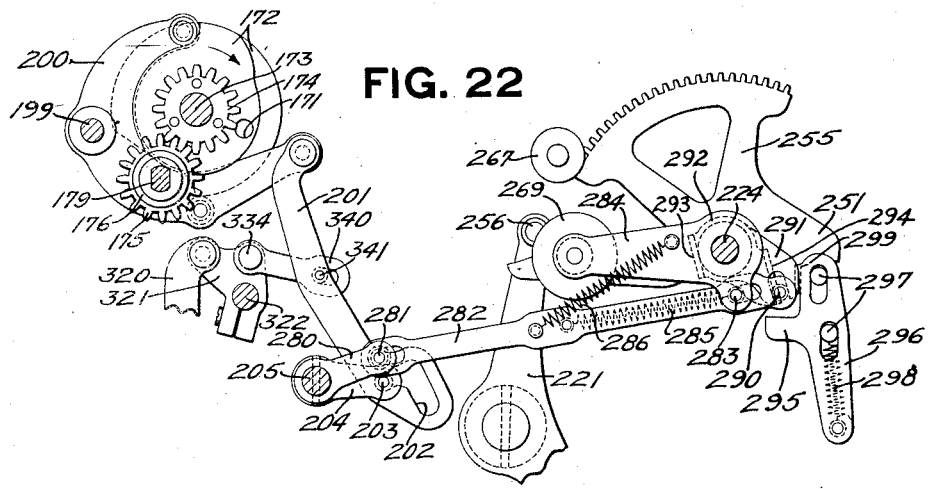
Fig. 22 is a detail view showing the knife and the check-ejector tension roller mechanism.
Figure 25:
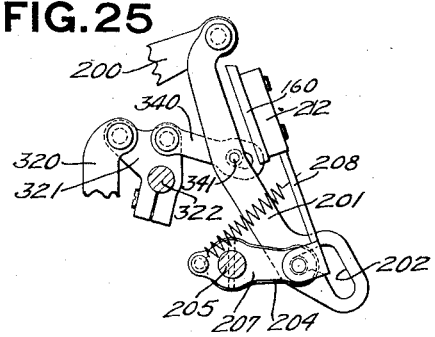
Fig. 25 is a detail view of a part of the knife mechanism.

A knife mechanism is provided for severing the check paper during each operation in which a check is issued. This mechanism is operated by the before mentioned cams 172 (Fig. 22) which are adapted to rock a lever 200, pivoted on a stud 199 carried by the frame 177, once during each operation of the machine. Pivoted to the lever 200 is a link 201 provided with an L-shaped slot 202 at the lower end thereof. A stud 203 carried by an arm 204 projects into the slot 202 and normally lies in the upper portion of the slot 202 as shown in Fig. 22. The arm 204 is secured to a shaft 205 mounted in the frame 177 and a frame 206. Also secured to the shaft 205 (Fig. 11) is an arm 207 which has pivoted thereto a link 208 provided with studs 209 held in engagement with holes in a knife blade 210 by a spring 211. The blade 210 is adapted to slide between two spring-pressed blocks 212 (Figs. 11 and 25). The blocks 212 are provided with oppositely facing flanges, overlying the blade 210, and which hold the blade 210 firmly against the before mentioned stationary blade 160, secured to a cross-bar 213 carried by the frames 177 and 206. The blocks 212 are secured to the cross-bar 213, by screws which pass through countersunk holes in the block 212. A spring surrounds each screw and bears against the head thereof and against the shoulder in the countersunk hole. The check paper passes through an opening in the blade 160, and above the blade 210, and therefore, when the cams 172 cause the blade 210 to be raised by means of the arm 200, link 201, arm 204, shaft 205, and arm 207, the paper is carried against the cutting edge of the knife 160 by the blade 210 and severed.

Lower impression mechanism

The lower impression hammer 220 (Figs. 11, 19 and 21) is adapted to make two impressions at each operation of the machine, during which a check is issued. This hammer is adapted to be automatically controlled when a slip is to be printed, for preventing one of those impressions from taking place. This control will be described when considering the slip printing mechanism.

Figure 18:
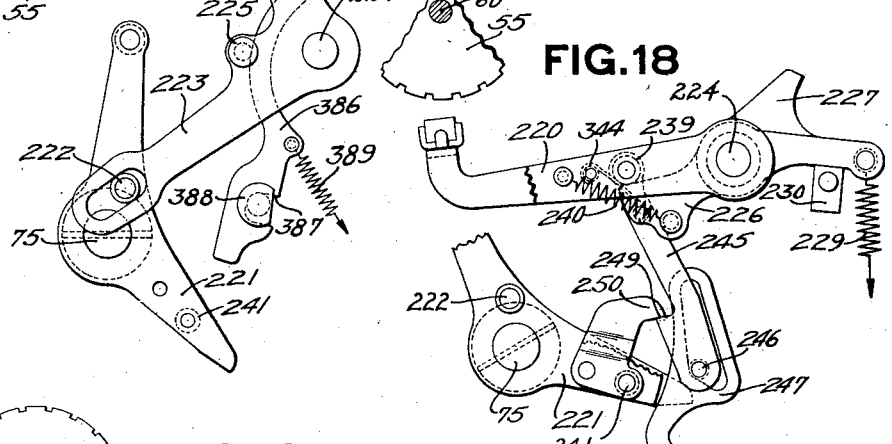
Fig. 18 is a detail view of the mechanism for causing the second impression to be made by the lower impression hammer, as shown in a partly operated position.
Figure 19:
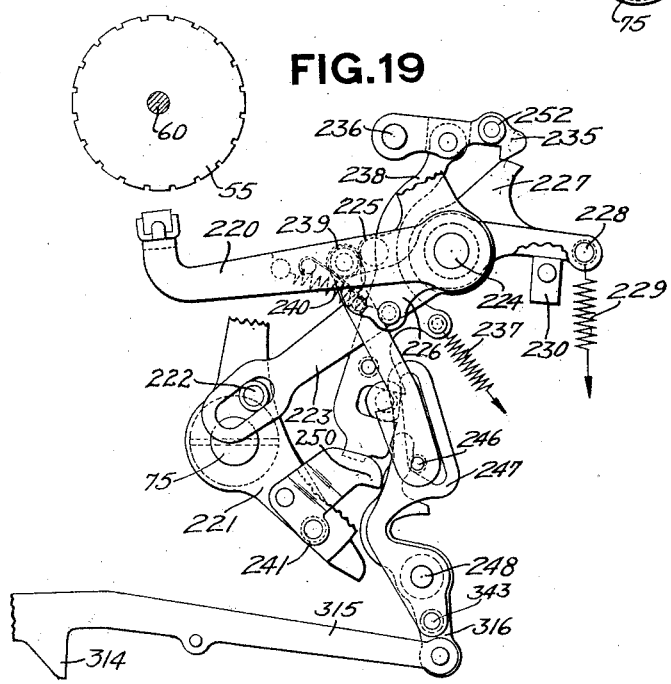
Fig. 19 is a detail view of the operating mechanism for the lower impression hammer.

The hammer 220 is normally in its discharged position, shown in Figs. 11, 18 and 19, and is retracted by an arm 221, which carries a stud 222 projecting into a slot in a bell crank 223 (Figs. 11 and 19), loosely mounted on a stud 224 carried by the printer frame 61. The bell crank 223 is provided with a stud 225 (see also Fig. 16), which is adapted to engage an arm of a lever 226 (Fig. 19), also pivoted on the stud 224. A rearwardly extending arm of the lever 226 is connected to a tripping arm 227, also loosely mounted on the stud 224, by means of a stud 228 and a hub on the stud 224. A powerful spring 229 normally holds the arm 227 against a block 230 carried by the frame 61.

As previously stated the shaft 75 is oscillated once during each operation by the arms 77 and 79, link 78 and shaft 76 (Fig. 3). These parts are so located, at normal, that the rotation of the shaft 76, rocks the shaft 75 first clockwise, then counter-clockwise past 75 first clockwise, then counter-clockwise past its normal position, and finally clockwise to normal.

The means for retracting, tripping and actuating the hammer 220 to take the first impression during a check printing operation will now be described.

During the first clockwise movement of the shaft 75 and consequently of the arm 221, the stud 222 will cause the bell crank 223 to rock in a counter-clockwise direction, thereby rocking the lever 226 and the tripping arm 227 in a counter-clockwise direction against the tension of the spring 229, until the tripping arm 227 is latched in its retracted position by a pawl 235. The pawl 235 tends to rotate in a clockwise direction on a stud 236, carried by the frame 61, under influence of a spring 237 attached to a link 238 (see also Fig. 15) pivoted to the pawl 235.

One arm of the hammer 220 is provided with a stud 239 (Figs. 19 and 21) held in engagement with the arm 226 by a light spring 240 stretched between a stud on the hammer 220 and a stud on the arm 226. Therefore, the hammer 220 follows the arm 226, and since the latter and the tripping arm 227 are latched by the pawl 235, the hammer 220 is likewise retained in its retracted position ready to be tripped and discharged to take an impression from the type wheels.

To release the hammer 220 the pawl 235 must be raised and disengaged from the arm 227. For this purpose the arm 221 carries a stud 241 which is normally quite some distance below the link 238. As the arm 221 is receiving its first clockwise movement the stud 241 is moved idly still farther from the link 238.

As the arm 221 moves counter-clockwise the stud 222 rocks the bell crank 223 clockwise, thus moving the stud 225 away from the arm of the lever 226. Since the arm 221 is moved counter-clockwise past its normal position, the bell crank 223 is moved clockwise past its normal position.

After the arm 221 has past its normal position while moving counter-clockwise, and near the limit of such movement, the stud 241 contacts the link 238 and raises the same sufficiently to disengage the latch 235 from the arm 227.

By the time the stud 241 reaches the lower end of the link 238 to raise the same, the stud 225 will have been moved upwardly past its normal position so as to give ample clearance between the same and the upper edge of the arm of the lever 226 when the latter is released as the pawl 235 is disengaged from the arm 227.

When such disengagement takes place, in the manner above stated, the spring 229 rotates the lever 226 and arm 227 rapidly in a clockwise direction until stopped by the block 230. This rapid movement of the lever 226 and arm 227 will cause the hammer 220 to be rocked rapidly in a clockwise direction. When the arm 227 is stopped by the block 230 the momentum of the hammer will be sufficient to overcome the tension of a light spring 240, and the hammer moves upwardly to take an impression from the type wheels, after which the spring 240 will lower the hammer until the stud 239 rests on the lever 226.

After the first impression has been made as just described, the knife mechanism is operated to sever the check after which the check-ejector mechanism is controlled, in a manner to be hereinafter described, to feed the severed check into position to receive a second impression. As just above stated the arm 221 is moved first, in a clockwise direction to retract the hammer 220 for the first impression, then in a counter-clockwise direction past normal position to release the hammer, and then clockwise to its home position to operate the hammer to make the second impression. The mechanism for making the second impression is best shown in Fig. 18. Pivoted on the hammer 220 is a link 245 provided with a stud 246 which projects into a slot in an arm 247 pivoted on a stud 248. The link is held in position by a spring 344 wound around the stud 239 and having one end against a stud on the hammer and the other end against a stud on the link 245. The slot in the arm 247 limits the movement of the link toward the left. The link 245 is provided with a shoulder 249 with which a block 250 secured to the arm 221 is adapted to cooperate on the second clockwise movement of the arm 221 as the latter returns to normal. The link 245 is pivoted on the above-mentioned stud 239 which is held in engagement with the arm 226 by the light spring 240. From this it is apparent that when the block 250 engages the shoulder 249 during its downward movement, it will cause the hammer 220, together with the arm 226, to be rocked counter-clockwise thereby stretching the spring 229 in the same manner as that accomplished by the bell crank 223 above described. The lower portion of the slot with which the stud 246 cooperates is so shaped that when the link 245 is moved downwardly by the arm 221, it will cause the shoulder 249 to be disengaged from the block 250, thereby permitting the spring 229 to rock the arm 226, together with the hammer 220, rapidly in a clockwise direction, until the arm 227 is stopped by the block 230 thereby arresting the lever 226, whereupon the hammer 220 will continue to move under influence of its momentum to take an impression in the manner above described.

During the time that the arm 221 is retracting the hammer 220, preparatory to taking the second impression, a means must be provided for rendering the pawl 235 (Fig. 19) ineffective, thus preventing the pawl from latching the arm 227 in its retracted position. This means is a part of the check feed and ejector mechanism shown in Fig. 24 and to be presently described, but it will be necessary here to mention that after the hammer 220 makes the first impression on the check, the feed and ejector mechanism feeds the check into position to receive the second impression, during which feeding movement of the check, a shoulder 251 on the check feed and ejector segment 255 engages a roller 252 carried by the pawl 235, thereby raising the pawl 235 up and preventing it from latching the arm 227 in its retracted position so that when the link 245 slips off the block 250 the spring 229 can operate the hammer 220 as previously described.

*Check feed and ejector mechanism*

Figure 1:
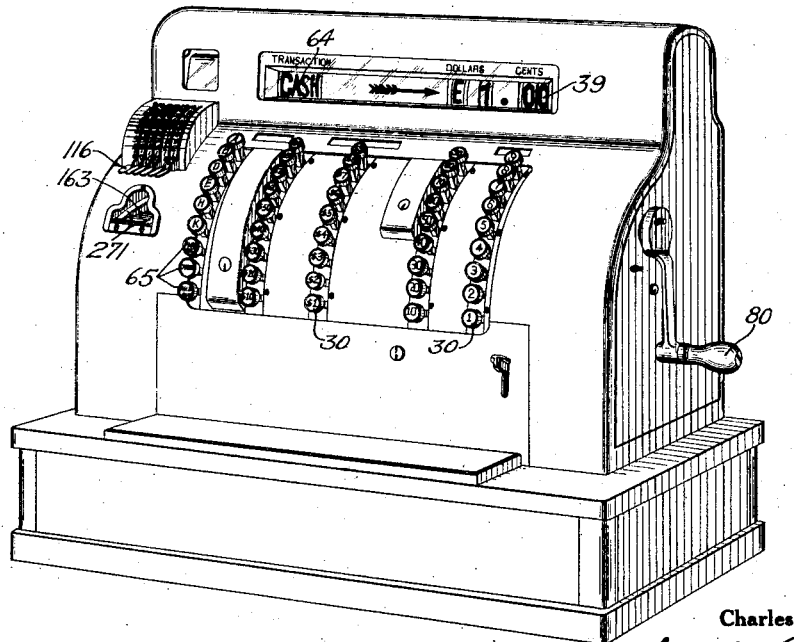

The check feed and ejector mechanism is adapted to feed the check between the two printing operations, as above mentioned, and after the second impression has been taken, to eject the check from the machine and into the receptacle 163 (Figs. 1 and 10). The method of feeding the check between impressions will be described first.

The before mentioned rocking arm 221 (Figs. 11, 22, 23 and 24), is adapted to first retract the segment 255, in which position it is latched until after the first impression is made, then the lower end of the arm 221 will unlatch the segment 255 and control the amount of movement thereof for feeding the check into position to receive the second impression.

The means for retracting the segment 255, latching the same, then releasing it to feed the check prior to the second impression, will now be described.

Figure 23:
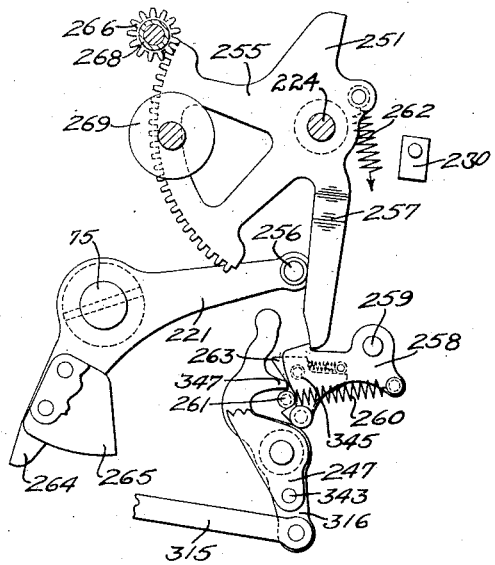
Fig. 23 is a detail view of a part of the check-ejector mechanism shown in its retracted position.

Mounted on the arm 221 is a roller 256 (Figs. 22 and 23) which as the arm 221 receives its initial clockwise movement, engages an arm 257 on the segment 255 and rocks the latter counter-clockwise against the tension of a spring 262 until the lower end of the arm 257 passes a shoulder on a latch 258 pivoted on a stud 259, whereupon the segment 255 is retained in its retracted position as shown in Fig. 23. A spring 260 stretched between a stud 261 on the frame 61 and a stud on the latch 258 normally holds the latch 258 in engagement with the stud 261. The latch 258 is provided with a flexible pawl 263 which lies in the path of the end 264 of the arm 221. When the arm 221 is rocked counter-clockwise after segment 255 has been latched in its retracted position, the end 264 of the arm 221 can pass the flexible pawl 263, but upon the return or second clockwise movement of the arm 221, as the latter returns from its past normal to its normal position, the end 264 thereof will engage the pawl 263 and rock the latch 258, thus disengaging the same from the arm 257 of the segment 255.

Figure 24:
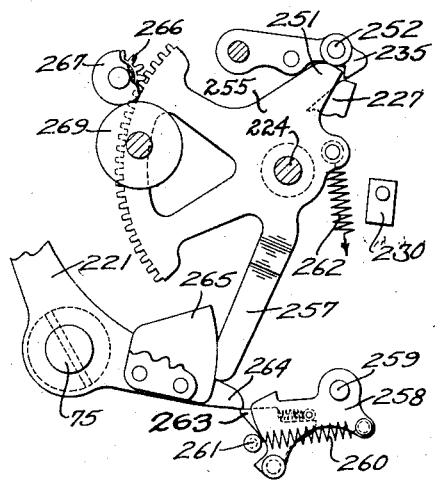
Fig. 24 is a detail view of a part of the check-ejector mechanism shown in the position to which it is moved for feeding the check between a first and second impression.

Upon such disengagement of the arm 257 from the latch 258, the spring 262 rotates the feed and ejector segment 255 clockwise from the position shown in Fig. 27 to that shown in Fig. 24, whereupon the arm 257 contacts and is stopped by a block 265 on the arm 221. The above release and clockwise movement of the feed and ejector segment 255 take place just prior to the engagement of the block 250 with hammer retracting link 245, and as the segment 255 meshes with a pinion 266 (Figs. 21, 23 and 24) connected by a sleeve 268 to a feed roller 267, the latter in conjunction with a tension roller 269, to be later described, feeds the check in position to receive the second impression.

After the second impression has been made, and as the arm 221 completes its second clockwise movement to normal, the block 265 passes off the arm 257, thereby permitting the segment 255 to be rotated rapidly under action of the spring 262 until the projection 251 engages the block 230 carried by the frame 61, thereby causing the check to be ejected from the machine and into the receptacle 163 as above mentioned.

A statement of operation of the lower impression mechanism and the check feed and ejector mechanism will now be given, with particular reference to the time at which the several functions occur.

As has been previously described, the first feeding movement of the check paper takes place by the electro rollers, whereupon the back of the check is printed (Fig. 14), the perforation across the check is made and all of the printing, as shown in Fig. 13, with the exception of the second and third lines, is printed.

The second line constitutes what has been previously called the second impression, and the third line is what has been called the first impression. The check is fed into position to receive the first impression by the electro and impression rollers above-mentioned. It is then severed, the first impression is made; it is then fed and the second impression is made, after which it is ejected.

During the first clockwise movement of the shaft 75 and arm 221 the hammer 220 is retracted by the lever 223 and the roller 256 on the arm 221 retracts the feed and ejector segment 255 which is held in retracted position by the latch 258. The hammer is held in its retracted position by the pawl 235.

During the counter-clockwise movement of the arm 221, after said arm has passed its normal position and near the end of the movement thereof the pin 241, through the link 238 raises the pawl 235 and releases the hammer to the action of the spring 229, whereupon the first impression is made.

During the second clockwise movement of the arm 221 as it returns to its normal position the end 264 thereof releases the latch 258 from the arm 257 of the check feed and ejector segment 255, whereupon the latter is moved clockwise and feeds the check into position to receive the second impression. The feed stops when the arm 257 strikes the block 265 on the arm 221. The block 250 then contacts and draws the link 245 downwardly thus retracting the hammer a second time, and upon continued movement of the arm 221 the link 245 is released from the block 250, thus freeing the hammer 220 to the action of its spring 229, which effects the second impression.

After the second impression, and as the arm 221 makes its second clockwise movement to normal, the block 265 passes off the arm 257, whereupon the spring 262 rotates the check feed and ejector segment 255 to eject the check into the receptacle 163. This ejecting movement takes place substantially at the very end of the operation of the machine.

The receptacle 163 is carried by the cabinet of the machine, and is provided with a pivoted check retaining detent 271 (Figs. 1 and 10). This member lies on the bottom of the receptacle and is forked as shown in Fig. 1. As the check is ejected it is forced under the detent 271 thereby preventing the check from being ejected entirely from the machine. The opening between the forks provides a finger hole for convenience in removing the check from the receptacle.

The tension roller 269 is controlled by the knife cams 172 (Fig. 22) and is so timed that the check paper will be gripped between the rollers 267 and 269 before the knife has completely severed the paper. Secured to the shaft 205 is an arm 280 provided with a stud 281 which projects into a slot in a link 282 carried by a stud 283 mounted in an arm 284 on which the tension roller 269 is mounted. The stud 283 projects into a slot in the link 282 and a spring 285 stretched between the stud 283 and a stud on the link 282 holds the left-hand end of the slot against the stud 283. A spring 286 stretched between a stud on the arm 284 and the link 282 normally tends to hold the tension roller 269 separated from the feed roller 267. However, when the shaft 205 is rocked in a counter-clockwise direction by the cams 172 as above described, the link 282 is moved to the left (Fig. 22), and through the spring 285 and stud 283, rocks the arm 284 in a clockwise direction, thereby carrying the tension roller 269 into engagement with the check to press it against the feed roller 267. The movement of the link 282 toward the left, is greater than necessary to carry the roller 269 against the check therefore, the left-hand end of the slot is moved away from the stud 283 thereby permitting the spring 285 to hold the roller 269 in engagement with the check to firmly press the same against the roller 267.

Since the release of the check ejector mechanism is so timed that the check will not be ejected until after the machine returns to its home position, therefore, it is necessary to provide some means for holding the tension roller 269 in its check-gripping position until after the shaft 205 returns to its home position. The segment 255 releases this device after the check has been ejected.

Mounted on the right-hand end of the link 282 (Figs. 21, 22 and 26) is a stud 290 which projects into a bifurcated arm 291 carried by the stud 224. The arm 291 is connected to an arm 292 by a yoke 293. The arm 292 is provided with a finger 294 bent at right angles thereto and which projects into the path of a step 295 on a vertically disposed slide 296. The slide 296 is mounted on two studs 297 and normally tends to move upwardly under influence of a spring 298. An ear 299 near the upper end of the slide 296 normally engages the shoulder 251 of the segment 255, thereby preventing the slide from moving upwardly. However, at the beginning of an operation of the machine, the segment 255 will be moved away from the ear 299, thereby permitting the step 295 to move upwardly to contact the lower edge of the finger 294. When the shaft 205 is rocked as above mentioned and the link 282 moves toward the left (Fig. 22), the stud 290 will rock the arm 291 and the finger 294 clockwise to move the lower edge thereof out of the path of the step 295, and in so doing the slide 296 is cammed downwardly very slightly, and when the lower edge of the finger 294 passes off of the step 295, the slide 296 springs upwardly to position the left-hand edge of the step 295 into the path of the right face of the finger 294. With the end of the step 295 in the path of the right face of the finger 294, the arm 284 is prevented from rocking counter-clockwise to separate the tension roller 269 from the feed roller 267. This construction is necessary because the link 282 must be rocked back to normal position during the latter part of the operation of the machine, whereas the segment 255 is released for ejecting the check at the very end of this operation. Therefore it is necessary to maintain the tension roller in its check-gripping position after the machine returns to its home position and until after the check is ejected. When the segment 255 is released as above described, for ejecting the check the shoulder 251 thereof strikes the ear 299, at the end of its movement, thereby forcing the slide 296 downwardly thus moving the step 295 from the finger 294. This will permit the spring 286 to rotate the arm 284 counter-clockwise thereby separating the tension roller 269 from the feed roller 267.

*On and off knob*

It is sometimes desirable to operate the machine without issuing a check. A knob 305 (Fig. 10) is provided for throwing off the mechanism for feeding the check paper, operating the consecutive number mechanism, the knife, the check ejector, and the check impression hammer, so that no check will be issued and nothing will be added to the consecutive number device. This knob 305 is secured to a shaft 306 (see also Fig. 6) to which is also secured a segmental plate 307. Also secured to shaft 306 is a collar 308 (Fig. 11) to which one end of a coil spring 309 is attached. This spring is wound around the shaft 306 and the other end bears against the frame 177. The spring 309 constantly tends to rotate the shaft 306 to its "on" position. This movement of the shaft 306 is limited by the engagement of the segmental plate 307 with a stud 304 carried by the frame 177. The segmental plate 307 is provided with a stud 310 (Fig. 6) adapted to enter a hole 311 in the frame 177 when the knob is in the "on" position. If, however, it is desired to disable these mechanisms, the knob is forced backwardly until the stud 310 is disengaged from the hole 311 and then the knob is turned counter-clockwise against the tension of the spring 309 until the stud 310 registers with an opening 312 in the frame 177 (Fig. 11) whereupon the spring 309 will force the shaft 306 outwardly to enter the stud in the opening 312, thereby holding the knob in its "off" position. When it is desired to throw the mechanism back "on", all the operator needs to do is press in on the knob 305, thereby compressing the spring 309 until the stud 310 is again disengaged from the opening 312 whereupon the spring 309 will rotate the shaft 306 in a clockwise direction until the segmental plate 307 engages the stud 304 in which position the stud 310 is in proper alinement to enter the opening 311, in which position the knob is in its "on" position.

When the knob is turned in a counter-clockwise direction from its "on" to its "off" position as above described, a stud 313 on the segmental plate 307 will engage a downwardly extending lug 314 of a link 315 connecting a lever 316 and a bell crank 317. A spring 318 normally tends to move the link 315 toward the right. When the pin 313 engages the lug 314 it will move the link 315 toward the left and rotate the bell crank 317 in a counter-clockwise direction, thereby rotating an eccentric shaft 319 upon which it is secured. Mounted on the eccentric portion of the shaft 319 is the before mentioned impression roller 157. Rotation of the shaft 319 will cause the impression roller 157 to be moved away from the printing cylinder feeding flanges 164 (Fig. 8). Pivoted to the other arm of the bell crank 317 is a link 320 which is also pivoted to an arm 321 secured to an eccentric shaft 322 for the upper impression roller 159. Rocking of the bell crank 317 counter-clockwise will lower the link 320 thereby causing the shaft 322 to be rotated in a counter-clockwise direction, thus moving the impression platen 159 away from the feeding flanges of the upper printing cylinder. From this it is evident that when the knob is in the "off" position, the check paper will not be fed, because both the impression rollers 157 and 159 will have been disengaged from their respective printing cylinders.

Cut in the link 320 is a slot 330 into which a stud 331, carried by the cam disk 140 (Fig. 9), for the lower cylinder projects. When the link 320 is lowered as just described, the slot 330 will permit the cam disk 140 to rock in a counter-clockwise direction about the pin 141 as a pivot. This movement of the cam disk 140 will move the cam race 139 to a position in which it is concentric with the shaft 153 which forms the rear bearing for the lower cylinder 136. When the cylinder is rotated, in a manner heretofore described, with the cam disk in this position, it will have no effect upon the arm 137, and therefore, nothing will be added into the consecutive number device for the lower printing cylinder.

Mounted on the arm 321 (Fig. 6) is a stud 334 which projects into a bifurcation in the before mentioned lever 143, which is mounted on the hub 176 of the gear 175 (Fig. 22). When the link 320 is lowered as above described, the arm 321, by means of the stud 334, will cause the lever 143 to rock in a clockwise direction, thereby rotating the cam disk 140 (Fig. 7) in a clockwise direction, about the stud 141 as a pivot, thereby moving the cam race 139 for this cam disk into a position in which it is concentric with the shaft 179. Then, when the upper cylinder 136 is rotated as above described, the cam race 139 for the upper cylinder will have no effect upon the arm 137, and therefore, nothing will be added into the consecutive number device for this cylinder.

When the knob 305 is moved to its "off" position, the severing mechanism is also disabled. Pivoted on the stud 334 (Fig. 22), on the before mentioned arm 321 is a link 340 provided with a slot surrounding a stud 341 carried by the link 201. When the link 320 is lowered as the knob is moved to its "off" position, thereby causing the arm 321 to rotate in a counter-clockwise direction, the link 340 will move the link 201 to the left (Fig. 22), thereby causing the elongated portion of the slot 202 to be moved into the path of the stud 203. Now, when the shaft 205 is rocked by the cams 172 as above described, the link 201 will move idly up and down without moving the shaft 205, thereby disabling the operation of the knife blade 209.

The disabling of the knife mechanism, as just described, will also prevent operation of the mechanism for moving the tension roller 269, into its check-gripping position. It will be remembered that the arm 280, which is also secured to the shaft 205, performs this function, and since the disabling of the knife prevents movement of the shaft 205, it is apparent that the tension roller 269 will remain in its lowered position.

The mechanism for releasing the printing hammer after it has been retracted by the bell crank 223, will be ineffective with the knob in the "off" position, because the link 238 will be moved to the right far enough so that when the stud 241 on the arm 221 (Fig. 19) travels upwardly it will not engage the lower end of the link. On all subsequent operations of the machine, with the knob in the "off" position, the hammer will remain in its retracted position. When the knob is moved back to the "on" position and the machine is operated, then, at the proper time during the operation of the machine, the hammer will again be released to take the proper impression.

The before mentioned lever 316 is provided with a rounded top 342 (Fig. 15) against which the link 238 is normally held by the spring 237. When the link 315 is moved to the left (Fig. 15), as above described, the rounded top of the lever 316 will be moved to the right, thereby permitting the spring 237 to rock the link 238 to the right. When in this position the bottom of the link 238 will be out of the path of the stud 241 on the arm 221, and therefore, when the machine is operated the stud 241 will not engage the link 238 to release the retracted impression hammer, and therefore, no impression will be taken.

It is also necessary to move the link 245 (Fig. 18), to its ineffective position so that the block 250 will not engage the shoulder 249 thereof. Secured to the lever 316 by means of a stud 343 and the hub of the lever 316 is the before mentioned arm 247. It will be remembered that the stud 246 on the link 245 projects into a slot of the arm 247. From this it can be seen that when the link 315 rocks the lever 316 clockwise, the arm 247, by means of its slot and the pin 246, will rock the link 245 toward the right (Fig. 18), thereby moving the shoulder 249 out of the path of the block 250. From this it is apparent that the second impression of the hammer will also be prevented.

As previously stated, the spring 344 (Fig. 18) is wound around the stud 239. One end of the spring engages a stud on the hammer 220, and the other a stud on the link 245, thereby holding the stud 246 against the left-hand edge of the slot in the arm 247.

During an operation in which a check is not to be issued, the check-ejector releasing mechanism is rendered ineffective so that the segment 255 (Fig. 23), will remain in its retracted position until a check is to be issued. The lever 316 is provided with a nose 347 in the path of which lies a stud 345 on the flexible pawl 263. When the lever 316 is shifted to the right by the link 315 the upper edge of the nose thereon will engage the stud 345 and rock the pawl out of the path of the end 264 of the arm 221, and therefore, the check ejector mechanism will not be released.

*Slip printing mechanism*

It is desired to print a sales slip every time the machine is operated with either a "received-on-account", "charge", or "paid-out" key depressed, no matter in what position the "on" or "off" knob might be. When the knob is in the "on" position, the transaction keys will throw off the second impression. When the knob is in the "off" position, the special keys will control the mechanism whereby the first impression is automatically thrown back on. It is always desirable to throw off the consecutive numbering, check feeding and severing mechanisms when a special key is depressed. The mechanism for accomplishing this is substantially the same as that described under the control of the "on" and "off" knob, and therefore only so much of it as is necessary to explain how it is controlled by the special keys will be given here.

The cabinet of the machine is provided with an opening through which the slip table 161 (Fig. 10), projects. The check receptacle 163 is provided with a pivoted slip detent 350 which has an upwardly turned lip 351 and which lies on the slip table by its own weight. The slip is placed on this table beneath the pivoted detent 350 in the proper position before the machine is operated.

Adjacent to the bank of keys (Fig. 6), which contains the "received-on-account", "charge", and "paid-out" keys, is a segmental plate 352 which lies in the path of the studs 66 on the transaction keys. The plate 352 is slidably mounted on a link 353 on studs 354. Mounted on the plate 352 is a block 355 which lies in the plane of a bell crank lever 356 pivoted on a stud 357 carried by the machine frame 31. The bell crank lever 356 is provided with a roller which cooperates with the before mentioned cam 100 which is adapted to rock the bell crank lever 356 clockwise during each operation of the machine. A spring 349 holds the roller on the bell crank lever 356 in engagement with the cam 100 at all times. Depression of any of the keys 65 will cause the stud 66 to engage the plate 352 and slide it inwardly on the link 353 to position the block 355 behind the cam surface 358 of the bell crank lever 356. When the cam 100 rocks the bell crank lever 356 clockwise, the cam surface 358 will engage the block 355, and move the plate 352 still further inwardly. The initial movement of the plate 352 will move the studs 354 to the left hand ends of the slots in the link 353. Now when the bell crank lever 356 gives the plate 352 its additional inward movement, it will move the link 353 inwardly. The link 353 is slidably mounted on the stud 359 at its front end and is pivoted to an arm 360, clamped to the before mentioned eccentric shaft 322. The inward movement of the link 353 will cause the disabling of the consecutive number device and of the check feeding mechanism by means of the lever 143, the arm 321, link 320, and bell crank 317. The second impression will be disabled by the mechanism just described, together with the link 315 and the lever 316 in a manner identical with that described for the "on" and "off" knob.

It will be remembered that when the link 315 is moved to the left (Fig. 15) the rounded top 342 of the lever 316 moves to the right, thereby permitting the spring 237 to rock the link 238 out of the path of the stud 241. When it is desired to print on a slip, it is necessary to move the link 238 back into the path of the stud 241 so that the proper impression can be made. This is accomplished by a lever 365 (Fig. 6) pivoted on a stud 366 carried by the printer frame 61. The lever 365 is provided with a stud 367 which projects into a slot in an arm of a bell crank 368 pivoted on a stud 369 on the frame 61. The other arm of the bell crank 368 is provided with a cam slot 370 into which projects a stud 371 on the above mentioned arm 71. It will be remembered that the arm 71 is rocked counter-clockwise by the cam arm 74 (Fig. 6) once at each operation of the machine. When a clerk's key is depressed, without depressing a transaction key, the lever 67 (Fig. 6) is permitted to move to its extreme position, thereby permitting the link 69 to move downwardly to its extreme position to indicate a cash sale. When in this position the arm 71 is held in the lowermost position of the slot 370 (Fig. 15), in which position the bell crank 368 is rocked counter-clockwise to move the lever 365 in a clockwise direction from that shown in Fig. 15, thereby permitting the spring 237 to swing the link 238 to the right out of the path of the stud 241. However, when one of the special keys 65 (Fig. 6) is depressed, its stud 66 will limit the movement of the lever 67, thereby limiting the movement of the link 69 and permitting the arm 71 to raise after the cam arm 74 returns to its normal position. When the arm 71 is thus controlled by one of the keys 65, the stud 371 will move into the concentric portion of the cam slot 370, thereby again rocking the lever 365 in a counter-clockwise direction. This movement of the lever 365, by means of the stud 242, will move the link 238 back into the path of the stud 241. Then when the arm 221 is rocked to the stud 241 will engage and raise the link 238 to disengage the pawl 235 from the retracted arm 227, thereby releasing the hammer to take an impression on the slip.

Detail record

It is desirable to take an impression on the detail strip during each operation of the machine, no matter what position the "on" and "off" knob is in, and therefore, this hammer is not controlled thereby. However, the bell crank 223 (Fig. 16) is also used for retracting the detail hammer 372 which is loosely mounted on a stud 373 carried by the frame 61 (see also Fig. 17). Also mounted on the stud 373 is an arm 374. One arm of the hammer 372 is provided with a stud 375 held against the arm 374 by a light spring 376. Secured to the arm 374, by a stud 380, is an arm 377 which cooperates with a roller 378 on the bell crank 223. Another arm 379 is also secured to the arm 374 by the stud 380. The arm 379 is provided with a stud 381 to which is attached a powerful spring 382 which normally holds the arm 379 against a square stud 383 mounted on the frame 61. Mounted on a stud 384 is a latch 385 having pivoted thereto a link 386 provided with a notch 387 surrounding a stud 388. A spring 389 normally holds the link in the position whereby the upper side of the notch 387 engages the stud 388.

When the arm 221 is rocked in a clockwise direction, the stud 222 thereon causes the bell crank lever 223 to rock in a counter-clockwise direction as above described, and, by the stud 378 thereon, causes the arms 374, 377 and 379 to rock clockwise. The spring 376 will cause the platen 372 to follow the arm 374. The bell crank 223 is adapted to move the arms 374, 377 and 379 until the lower part of the arm 379 engages the latch 385, whereupon it will cause the latch to rock in a counter-clockwise direction against the tension of the spring 389. After the end of the arm 379 passes a notch 395 in the latch 385, spring 389 will rock the latch 385 clockwise, thereby holding the said arms in their retracted positions against the tension of the spring 382. Upon counter-clockwise movement of the arm 221 the stud 241 will engage the lower end of the link 386, thereby releasing the arm 379 and permitting the spring 382 to rock the arm 379 rapidly in a counter-clockwise direction until stopped by the square stud 383. The momentum of the hammer 372 at this time will be sufficient to overcome the tension of the spring 376 and thereby permit an impression to be taken upon the detailed record strip.

Figure 16:
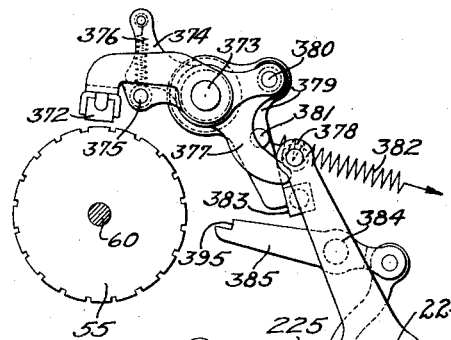
Fig. 16 is a detail view of the upper impression operating mechanism.
Figure 17:
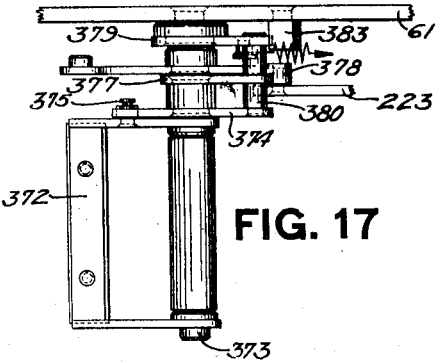
Fig. 17 is a plan view of the upper impression mechanism.

After the impression has been taken on the detail strip, the arm 221 rocks clockwise to its home position. This last clockwise movement of the arm 221 returns the bell crank 223 to its home position, as shown in Fig. 16, and permits the latch 385 to return to its home position ready for the next operation of the machine. It should be kept in mind that a cycle of movement of the arm 221 includes, first, a clockwise movement to retract the platen; second, a counter-clockwise movement past its home position to release the platen; and third, a clockwise movement back to its home position, the third movement being insufficient to again retract the platen.

Detail record strip feed

The detail record strip is fed from a supply roll 396 (Fig. 10), under a stud 397 around a roller on the stud 373 over a stud 398 to a receiving roll 399. Attached to the receiving roll is a ratchet 400 (Figs. 11 and 20), adapted to be rotated by a pawl 401 pivoted on a rocking lever 402. Mounted on the lever 402 is a stud 403 which engages a bifurcated arm 404 of a three-armed lever 405 pivoted on a stud 406 which also supports the detail strip supply roll 396. An arm 407 of the lever 405 also engages a stud 408 on a lever 409 loosely mounted on the stud 373. The lever 409 is adapted to be engaged by the stud 378 carried by the bell crank 223. When the bell crank 223 is rocked in a counter-clockwise direction as before described, it will cause the arm 402 to rock clockwise by means of the levers 405 and 409, thereby moving the ratchet 400 one step forwardly. A spring 410 holds the lever 409 against the stud 378, and therefore, when the bell crank 223 returns to its home position, the spring 410 will cause its associated mechanism to follow therewith. A spring-actuated retaining pawl 411 is provided to prevent retrograde movement of the ratchet 400.

Ink ribbon mechanism

A reversible ink ribbon is provided for making the impression from the type carriers on the detailed record, check, and inserted slip legible. The ribbon is fed from a spool 420 (Figs. 2 and 11) over four studs 421 supported by the removable frame 126, over a felt inking roller 422 back to another spool 420. The spools are constructed in the manner shown and described in Letters Patent 1,578,209, issued to Charles F. Rosien, on March 23, 1926, and reference may be had thereto for a detailed description of these spools. The ribbon is fed by an arm 423 of the three-armed lever 405 (Fig. 20) which engages a stud on a feed arm 424 pivoted on a stud carried by the frame 177. Pivoted on the feed arm 424 is an arm 425 which carries two triangular plates 426, one of which is adapted to engage a gear 427 and the other of which is adapted to engage a gear 428. When the lever 405 is rocked it will cause the feed arm 424 to rock first clockwise and then counter-clockwise. The triangular plates 426 are held in the positions shown, by a spring-pressed pawl 429, and the gear 427 is rotated in a clockwise direction, when the feed arm 424 is rocked as just mentioned thereby causing the ribbon to be wound up on the upper spool 420. When the end of the ribbon on the lower spool 420 is reached, the ring 430 is permitted to rotate on a stud 431, thereby permitting a bell crank 432, having a stud 433, to engage a recess 434 under the action of the coil spring 435. When in this position the tooth 436 of the bell crank 432 will engage the gear 427 thereby preventing further rotation thereof. During the next operation of the machine, with the gear 427 locked against movement, when the feed arm 424 rotates clockwise, it will cause the two triangular plates 426 to rotate thereby causing the rear triangular plate to engage the gear 428 and disengage the front plate 426 from the gear 427. On succeeding operations of the machine, the gear 428 will be rotated in a clockwise direction, which in turn will rotate a gear 437 clutched to the lower spool 420 in a counter-clockwise direction, thereby causing the ribbon to be rewound on the lower spool 420.

Figure 2:
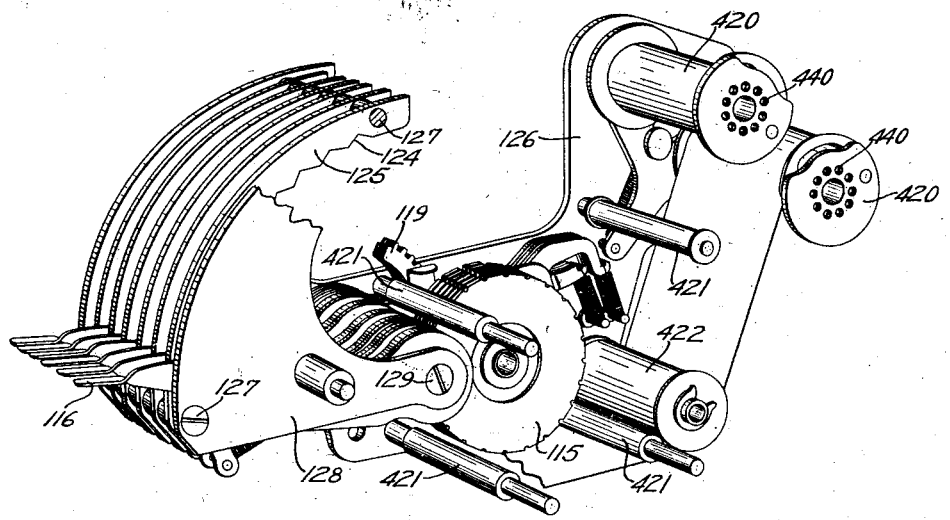
Fig. 2 is a perspective view of a removable frame which supports the inking ribbon and the ledger number device.

A notched disk 438 is provided for lifting the triangular plates 426 from between the teeth of the gears 427 or 428 when the feed arm 424 is returned to its normal position during each operation of the machine. A retaining pawl 439 is provided for preventing retrograde movement of the disc 438 so that it can be effective for camming the triangular plates from engagement with the above mentioned gears. The spools 420, studs 421 and inking roller 422 are all supported by the frame 126 and are removable from the machine as a unit as indicated in Fig. 2, so as to permit replacing the ink ribbon whenever it becomes worn. Suitable openings are provided in the frame 61 for receiving the studs 421. The gears 427 and 437 are supported on studs upon which the spools 420 are supported. The rear ends of the spools 420 are provided with openings 440 into which are adapted to be entered, projections on their respective gears so that they can be driven thereby. The frame 126 is held in position by a knurled nut 421 (Fig. 10), screwed on the stud 60 that supports the type wheels. The ledger number type wheels are supported on a hollow sleeve through which the stud 60 projects, and when it is desired to remove the frame from the machine it is necessary to first unscrew the nut 421 after which it is free to be drawn out of the machine.

Operation

Depression of any of the amount, clerk or transact on keys will control the operation of differential mechanisms for setting up type characters and indicators and for the entering of amounts into the totalizer. The adjustment of the ledger number device levers will directly position the type carries for the ledger number. If a cash transaction is to be entered, the operator will depress a clerk's key without depressing a transaction key in combination therewith. During this kind of operation a stub receipt will be issued. If, however, a transaction key is depressed in combination with a clerk's key, the mechanism will be automatically controlled whereby a single impression will be made for making a record on an inserted sales slip.

The check paper is fed through the machine by printing cylinders 136, which are also adapted to print the date and consecutive numbers and also print from any special electro which may be desired. While the check is being fed into position to receive an impression thereon, the printing hammer 220 is retracted. After the paper is in proper position, the hammer will be released, thereby taking an impression thereon.

After the first impression has been taken, the tension roll mechanism (Fig. 22) is permitted to move into the position, in which it grips the check paper, whereupon the knife mechanism severs the check. After the check has been severed, the check ejector mechanism is partially operated, thereby causing the check to be fed into position for having a second impression made thereon. When the check is so positioned, the hammer 220 is again retracted and tripped, and a second impression is made on the stub part of the check. At the very end of the operation of the machine, the check ejector mechanism is released and the check is thereby ejected into a receptacle, from where the operator can remove it.

A manually operable knob 305 (Fig. 10) is provided for disabling the check issuing mechanism when desired. When the knob is in the "off" position and the machine is operated with a transaction key depressed in combination with a clerk's key, a mechanism is operated for rendering effective one impression mechanism, in order to get one impression on the slip. If the machine is operated with the knob in the "on" position, a mechanism controlled by the transaction key will disable one impression so that only one impression will be made on the inserted slip.

A detail strip is provided and it is wound up on a receiving roll in the machine, upon which each transaction is printed and operates during each operation of the machine, no matter what kind of transaction is being entered.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, a main operating shaft movable forwardly, then backwardly beyond home position and then forwardly to home position during each operation of the machine, an impression means, and means secured on the shaft for retracting said impression means during the first forward movement of the shaft and again retracting it during the last movement of said shaft.

2. In a machine of the class described, an impression means, a spring actuated operating means therefor, means for retracting said operating means twice during an operation of the machine, a catch for holding said operating means retracted, and means for preventing functioning of said catch during the second retracting movement of said operating means.

3. In a machine of the class described, an impression means, a spring actuated operating means therefor, means for retracting said operating means, a catch for holding said operating means in retracted position, means for moving said catch to release said operating means to cause an impression to be made on an issuing check strip, means for feeding the strip after said impression has been made, means operated as the feeding is effected for holding said catch out of functioning position, and automatic means to control the feeding means to function to eject the check.

4. In a machine of the class described, the combination of a spring actuated check ejector means, means for retracting said ejector means, a latch for holding said ejector means in its retracted position during every operation of the machine, and means for releasing said latch during certain of said operations thereby permitting said ejector means to operate and means to determine the effectivity of the releasing means.

5. In a machine of the class described, the combination of a spring actuated check ejector means, means for retracting said ejector means, a latch for holding said ejector means in its retracted position during every operation of the machine, said latch including a movable member, means for releasing said latch during certain of said operations thereby permitting said ejector means to operate, and means to shift the movable member of the latch out of effective relation with the releasing means thereby preventing the release of said latch and the check ejector means.

6. In a machine of the class described, the combination of a check ejector roller, a spring actuated segment cooperating therewith, an arm on said segment, a bell crank adapted to receive an oscillatory movement during each operation of the machine, a projection on said bell crank cooperating with said arm for retracting said segment, a latch for holding said segment in its retracted position, and a flexible pawl on said latch adapted to cooperate with said bell crank for causing said latch to release said segment.

7. In a machine of the class described, the combination of a check ejector roller, a spring actuated segment cooperating therewith, an arm on said segment, a bell crank adapted to receive an oscillatory movement during each operation of the machine, a projection on said bell crank cooperating with said arm for retracting said segment, a latch for holding said segment in its retracted position, a flexible pawl on said latch adapted to cooperate with said bell crank for causing said latch to release said segment, a manipulative device, and an arm operatively connected to said manipulative device and adapted to rock said flexible pawl out of cooperating relation with said bell crank thereby preventing release of said segment.

8. In a machine of the class described, the combination of a plurality of manipulative means, a spring actuated check ejector means, means for retracting said ejector means, a latch for holding said ejector means in its retracted position during every operation of the machine, means for releasing said latch during certain of said operations, means controlled by said manipulative means to determine the effectivity of the releasing means, and means for temporarily arresting said ejector means and then freeing it to permit it to return to its home position.

9. In a machine of the class described, the combination of a spring actuated segment, an arm on said segment, a bell crank adapted to receive an oscillatory movement during each operation of the machine, a projection on said bell crank cooperating with said arm for retracting said segment, a latch for holding said segment in its retracted position, a flexible pawl on said latch adapted to cooperate with said bell crank for causing said latch to release said segment, and a block on said bell crank for arresting said segment after it has been released from said latch, said block being adapted to release said segment at the end of the operation of the machine.

10. In a machine of the class described, the combination of a spring actuated check ejector segment, a feed roller adapted to be operated thereby, a tension roller adapted to cooperate with said feed roller, means for releasing said ejector segment at the end of the operation of the machine, and means for holding said tension roller in cooperating relation with said feed roller until the check ejector segment has completed its operation.

11. In a machine of the class described, the combination of a spring actuated check ejector segment, a feed roller adapted to be operated thereby, a tension roller adapted to cooperate with said feed roller, means for releasing said ejector segment at the end of the operation of the machine, and an arm on said segment for releasing said tension roller as the segment completes its operation.

12. In a machine of the class described, the combination of a check ejector segment, a feed roller adapted to be operated thereby, a normally disengaged tension roller adapted to cooperate with said feed roller, means for engaging said tension roller with said feed roller, a latch for latching said means in its engaging position, and an arm on said segment for disengaging said latch from said means thereby permitting said tension roller to move to its normal position.

13. In a machine of the class described, the combination of a check ejector mechanism, a tension roller normally in an ineffective position, means for moving said tension roller to an effective position, and means controlled by said ejector mechanism to enable said tension roller to move into its ineffective position as said mechanism completes its operation.

14. In a machine of the class described, the combination of a feed roller, a cooperating tension roller normally out of cooperative relation with said feed roller, yielding means for moving said tension roller into cooperative relation with respect to said feed roller, a latch cooperating with said yielding means to hold said tension roller in cooperative relation with said feed roller, and means for moving said latch to unlatching position.

15. In a machine of the class described, the combination of an impression device, means for tripping said device for taking an impression, another means for retracting and tripping said device for taking a second impression and a common means to actuate the first two mentioned means.

16. In a machine of the class described, the combination of an impression device, means for tripping said device for taking an impression, another means for tripping said device for taking a second impression, and a single rocking arm for operating both of said tripping means.

17. In a machine of the class described, the combination of an impression device, means for tripping said device for taking an impression, a second means for tripping said device for taking a second impression, and a single rocking arm adapted to operate one of said tripping means when travelling in one direction, and adapted to operate the other of said tripping means when travelling in the opposite direction.

18. In a machine of the class described, the combination of an impression device, an arm for retracting said impression device, a latch for holding said device in its retracted position, a link pivoted to said latch, a rocking arm, a stud on said rocking arm adapted to cooperate with said link for unlatching said latch to enable said device to take an impression, a link on said device, and a projection on said rocking arm adapted to cooperate with said link on said device for retracting and releasing said device to cause said device to take a second impression.

19. In a machine of the class described, the combination of an impression device, an arm for retracting said impression device, a latch for holding said device in its retracted position, a link pivoted to said latch, a rocking arm, a stud on said rocking arm adapted to cooperate with said link when said rocking arm is moving in one direction, for unlatching said latch to enable said device to take an impression, and a projection on said rocking arm adapted to cooperate with said link on said device, when travelling in the reverse direction, for retracting and releasing said device to cause said device to take a second impression.

20. In a machine of the class described, the combination of a retractable impression device, means for tripping said device after it has been retracted for taking an impression, another means for tripping said device for taking a second impression, and common means for rendering both of said tripping means ineffective.

21. In a machine of the class described, the combination of an impression device, means for retracting said impression device, a latch for latching said impression device in its retracted position, a spring actuated link pivoted on said latch, a rocking arm adapted to cooperate with said link for unlatching said latch to enable the impression device to take an impression, means for holding said link in a position whereby said rocking arm will cooperate therewith, and a manipulative device for moving said last mentioned means to a position whereby said link will be permitted to move out of cooperating relation with said rocking arm, thereby retaining said impression means in its retracted position.

22. In a machine of the class described, the combination of a check issuing mechanism means for taking two impressions on each check, a manipulative device for throwing off the check issuing mechanism and the means for taking two impressions, and a plurality of manipulative devices for controlling said impression means to make one impression on an inserted slip.

23. In a machine of the class described, the combination of a check issuing mechanism, an impression device, means for retracting said device, means for tripping said device after it has been retracted, another means for retracting said device, another means for tripping said device after it has been retracted by said second mentioned retracting means, a manipulative device for preventing operation of both tripping means and the second mentioned retracting means and said check issuing mechanism, and a plurality of manipulative devices for causing the first mentioned tripping means to operate when said check issuing mechanism is prevented form operating, for taking an impression on an insertable slip.

24. In a machine of the class described, the combination of a check issuing mechanism, an impression device, a rockable arm, a bell crank operably connected to said arm for retracting said device, a latch for holding said device in its retracted position, a link pivoted to said latch, a projection on said arm adapted to engage said link for unlatching the retracted device to enable it to take an impression, a member pivoted to said device, another projection on said arm adapted to engage said member for retracting the device to take a second impression, a lever having a cam slot adapted to cooperate with said member for disengaging the member from said second mentioned projection, a knob for moving said link and said member out of the path of said projections on said arm, to render said impression device ineffective, and a plurality of depressible keys for controlling said link whereby it is moved back into the path of said projection to take an impression on an insertable slip.

25. In a machine of the class described, the combination of an impression mechanism adapted to take two impressions during an operation of the machine, a manipulative device for throwing both impressions off, and a plurality of manipulative devices for throwing one impression on when said device throws both impressions off and for throwing one impression off when said device throws both impressions on.

26. In a machine of the class described, the combination of an impression device, means for retracting said device, means to hold the impression device in retracted position, means associated with said device and said holding means and adapted to be moved into coperative relation with said holding means, to render the latter effective, means for tripping said device to take an impression, another means for retracting and tripping said impression device to take a second impression, and a common operating means for actuating the first tripping means and the retracting and tripping means.

27. In a machine of the class described, the combination of an impression device, means for retracting said impression device, an operating member for said retracting means, means to hold the impression device in retracted position, means associated with said device and said holding means and normally disconnected from said holding means and adapted to be moved into cooperative relation therewith by said retracting means to render the holding means effective, means on said operating member for disconnecting the holding means from the intermediate means, and a device including a member connected to the impression device and a member connected to said operating member, for retracting and tripping the impression device a second time.

28. In a machine of the class described, the combination with an impression device; of a driving element therefor; separate means to successively retract and release the driving element; means to restrain the driving element in retracted position on its first retraction; means to trip the restraining means to free the driving element for effective operation; and means to retain the restraining means ineffective during the second retraction and release of the driving element.

29. In a machine of the class described, the combination of an impression device normally in retracted position; means for retracting said device; a latch for holding the device in retracted position; a latch operating member connected to said latch; a member adapted to operate said retracting means, operate said latch operating means, retract and trip the impression device a second time, and simultaneously disable the latch; and means under control of a manually operated member for moving the latch operating means into an ineffective position to prevent operation of the latch.

In testimony whereof I affix my signature.

CHARLES H. ARNOLD.